(12) United States Patent
Hager

(10) Patent No.: US 7,709,779 B2
(45) Date of Patent: May 4, 2010

(54) METHOD AND APPARATUS FOR DETECTING AN OPTICAL REFLECTION INDICATIVE OF A PHOTODIODE

(75) Inventor: Harold E. Hager, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 84 days.

(21) Appl. No.: 11/870,781

(22) Filed: Oct. 11, 2007

(65) Prior Publication Data

US 2009/0095885 A1 Apr. 16, 2009

(51) Int. Cl.
*H01L 31/00* (2006.01)
*G01J 3/50* (2006.01)

(52) U.S. Cl. .................................... 250/214.1; 250/226

(58) Field of Classification Search ................. 250/226, 250/208.1, 221, 239, 203.6, 203.1, 203.4, 250/214.1; 356/4.01; 340/545.3, 565, 567
See application file for complete search history.

(56) References Cited

U.S. PATENT DOCUMENTS

| 4,677,289 | A * | 6/1987 | Nozaki et al. ............... 250/226 |
| 7,145,124 | B2 * | 12/2006 | Garrood et al. .......... 250/208.1 |
| 2001/0028458 | A1 * | 10/2001 | Xiao .......................... 356/417 |
| 2007/0090310 | A1 * | 4/2007 | Hamilton et al. ....... 250/559.45 |
| 2008/0094632 | A1 * | 4/2008 | Harsh et al. ................. 356/436 |

OTHER PUBLICATIONS

G. Masini, "Monolithic and hybrid near infrared detection and imaging based on poly-Ge photodiode arrays", Optical Materials, Oct. 18, 2004, vol. 27, Issue 5, pp. 1079-1083.

* cited by examiner

*Primary Examiner*—Que T Le
*Assistant Examiner*—Pascal M Bui-Pho
(74) *Attorney, Agent, or Firm*—Yee & Associates, P.C.; Kevin G. Fields

(57) ABSTRACT

A system and methods for detecting semiconductor-based photodiodes. The present embodiments provide a simple and practical approach for identifying optical reflection that is indicative of photon reflection from semiconductor-based photodiodes. Thus in certain applications the present embodiments may be used to detect the presence of OIEDs, which may use photodiodes as part of a detonation system.

17 Claims, 3 Drawing Sheets

METHOD AND APPARATUS FOR DETECTING AN OPTICAL REFLECTION INDICATIVE OF A PHOTODIODE

BACKGROUND

1. Technical Field

The present disclosure relates to detection of improvised explosive devices and other devices.

2. Description of Related Art

The control electronics in Improvised Explosive Devices (IEDs) typically rely on radio frequency (RF) transmitters and receivers. These components can be readily obtained through exploitation/disassembly of mass market electronics, such as RF-emitting garage door openers, cell phones, automotive key-fobs, etc. As apparatus and methods are developed to counter RF-based IEDs, builders of such devices will naturally transition to alternative control electronics.

One possible alternative is optical control systems. The IED could include a silicon photodetector that would detect an infrared (IR) beam. These systems could be based on simple modifications of IR-transmitting remote controllers. For example, it would be very simple to replace the light-emitting diode (LED) in the IR remote control systems commonly incorporated in TVs and other consumer electronics with a semiconductor laser emitting at an IR wavelength compatible with the control unit receiver. The resulting IR remote control system would have a much larger standoff distance capability, due to the far narrower laser beam divergence.

As makers of IEDs transition from controllers that are RF-based to those that are optically controlled, new challenges in locating these IEDs and neutralizing them will arise. Detection of the IR remote control receiver system is difficult due to the small size of photodetectors, the dynamic nature of the IR ambient environment, and wide variations in IR reflectivity from other background objects. While multispectral and hyperspectral imaging systems (e.g., acousto-optic tunable filter (AOTF) based video imaging systems) could be used to detect Si-based photodetectors in principle, the imaging rates would be too slow or have insufficient resolution to be useful. Other detection schemes have been used to identify video camera systems in environments of interest, such as in movie theatres to defeat unauthorized recording of movies. However, the approaches used to detect video cameras, essentially on the basis of physical optics (lens) detection, do not represent a viable solution to detecting optically-controlled IEDs.

SUMMARY

The embodiments of the present system and methods for detecting semiconductor-based photodiodes have several features, no single one of which is solely responsible for their desirable attributes. Without limiting the scope of the present embodiments as expressed by the claims that follow, their more prominent features will now be discussed briefly. After considering this discussion and particularly after reading the section entitled "Detailed Description", one will understand how the features of the present embodiments provide advantages, which include reliable detection of photodiodes at high resolutions and high scanning speeds.

The present embodiments provide technical approaches to locate optically controlled IEDs (OIEDs) via detection of the associated IR remote control receiver system. These embodiments are advantageously capable of rapid broad area surveillance. Once an OIED has been detected, appropriate countermeasures can be taken. Such measures may include disabling the control mechanisms of the OIED, such as by broadcast of modulated IR beams, or direct destruction of the OIED.

One embodiment of the present system and methods for detecting semiconductor-based photodiodes comprises a photodetector device for detecting an object, the object including an object photodiode. The photodetector device comprises a photodiode array including a plurality of subarrays. A first one of the subarrays includes a plurality of pixels. The photodetector device further comprises an optical filter layer overlying at least some of the pixels. The optical filter layer comprises a plurality of elements, with each of the elements being aligned with one of the pixels. The object photodiode comprises a material having a band gap energy, and each of the elements has a different spectral response in the wavelength range associated with the band gap energy of the object photodiode.

Another embodiment of the present system and methods for detecting semiconductor-based photodiodes comprises a method of detecting an object. The method comprises the step of receiving light reflected from the object at a photodiode array including a plurality of subarrays. A first one of the subarrays includes a plurality of pixels. The method further comprises the step of filtering the received light through an optical filter overlying at least some of the pixels. The optical filter layer comprises a plurality of elements, with each of the elements being aligned with one of the pixels. The method further comprises the steps of comparing signals from each pixel in the first subarray, and determining whether the object comprises a material having a band gap energy within a target range.

The features, functions, and advantages of the present embodiments can be achieved independently in various embodiments, or may be combined in yet other embodiments.

BRIEF DESCRIPTION OF THE DRAWINGS

The embodiments of the present system and methods for detecting semiconductor-based photodiodes will now be discussed in detail with an emphasis on highlighting the advantageous features. These embodiments depict the novel and non-obvious system and methods shown in the accompanying drawings, which are for illustrative purposes only. These drawings include the following figures, in which like numerals indicate like parts.

DETAILED DESCRIPTION

The present embodiments provide a simple and practical approach for identifying optical reflection that is indicative of photon reflection from semiconductor-based photodiodes. Thus in certain applications the present embodiments may be used to detect the presence of OIEDs, which may use photodiodes as part of a detonation system. In other applications the present embodiments may be used to detect digital cameras, which may include Si photodiodes behind a lens. A camera, while not necessarily inherently dangerous, may indicate unwanted surveillance.

Figure 1:
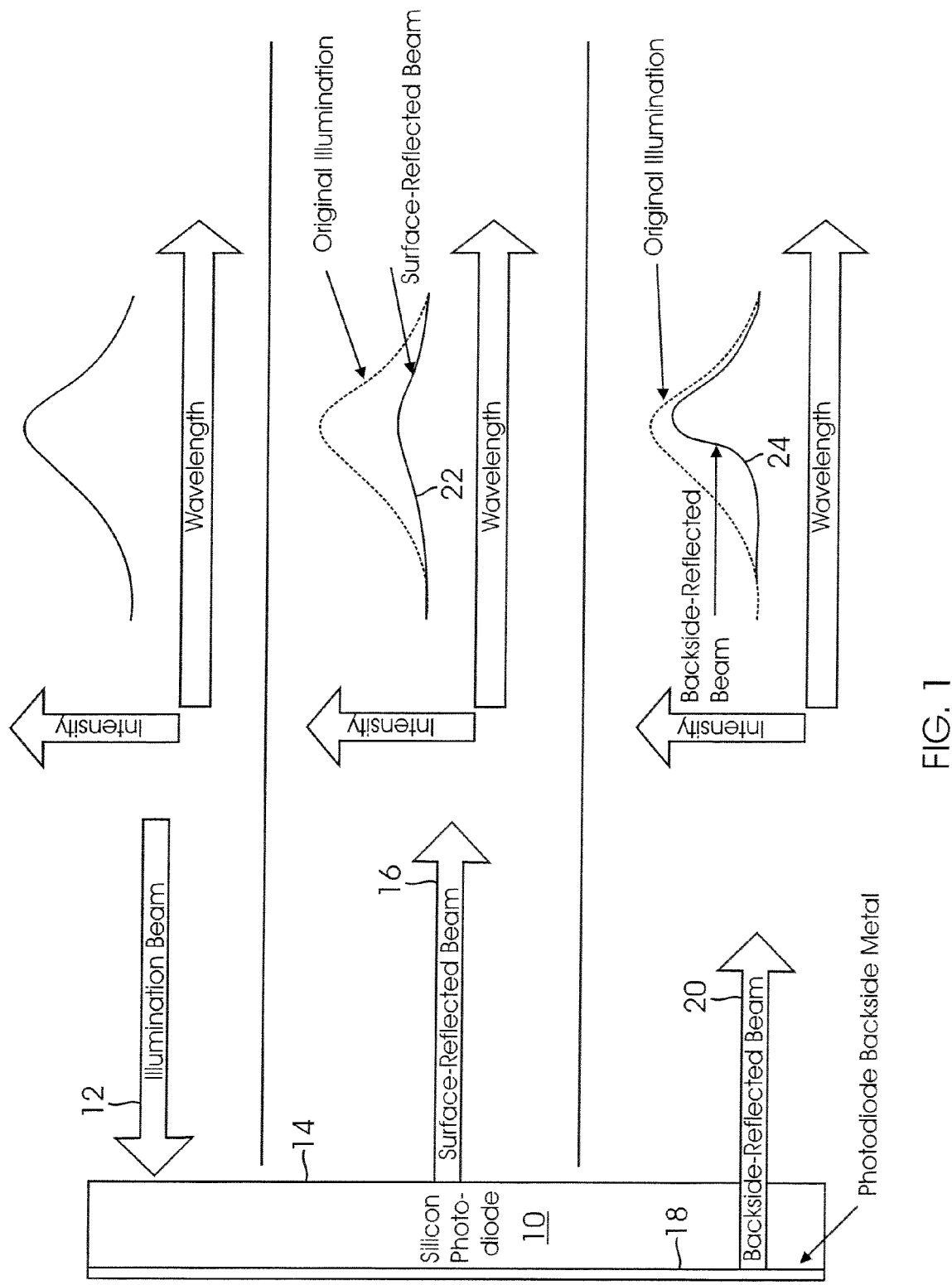
FIG. 1 is a graphical comparison of the spectral intensity distributions for an illumination beam, a beam reflected from the surface of a photodiode and a beam reflected from the backside of a photodiode.

The present system and methods for detecting objects having photodiodes are based on the variations in spectral intensity of light reflected from objects/surfaces having different chemical compositions. FIG. 1 schematically illustrates the spectral reflection characteristics from a silicon photodiode 10. An illumination beam 12 is directed at the photodiode 10. A first fraction of the beam is reflected from a surface 14 of the photodiode 10 (surface reflected beam 16), and a second fraction of the beam is reflected from a backside metallization layer 18 of the photodiode 10 (backside reflected beam 20). The spectral intensity curves for each beam 12, 16, 20 are shown on the right-hand side of FIG. 1. Each curve is plotted on an x-y axis, with wavelength extending along the x axis and intensity extending along the y axis. As shown, the shape of the spectral intensity curves 22, 24 for the two reflected beams 16, 20 differ significantly In the backside reflected beam 20 there is much higher attenuation of the shorter wavelength light due to bandgap absorption for these higher energy photons.

The present embodiments employ a modified photodiode array in order to detect objects having photodiodes. Photodiodes are typically constructed of silicon (Si), but can also be constructed of other semiconductor materials. For simplicity, the discussion herein will focus on embodiments that are configured to detect silicon photodiodes. However, those of ordinary skill in the art will appreciate that the present embodiments are not limited to detecting silicon.

In certain embodiments the present modified photodiode array includes a plurality of subarrays. Each subarray includes elements that have differing spectral responses in the wavelength range associated with the bandgap energy of Si. By comparing the signals from the elements within each subarray, it can be determined whether the illumination striking that subarray has been reflected by an object having a bandgap energy of approximately 1.1 eV, which is the bandgap energy of silicon. On a video display (not shown), the subarrays identified as receiving illumination reflected from Si photodiodes may be shown with an overlaid color, which is selected to highlight the presence of potential OIEDs (or other objects of interest). This subarray analysis and display marking can be performed in real time, allowing the user to employ the OIED detection system as a standard video system.

Figure 2:
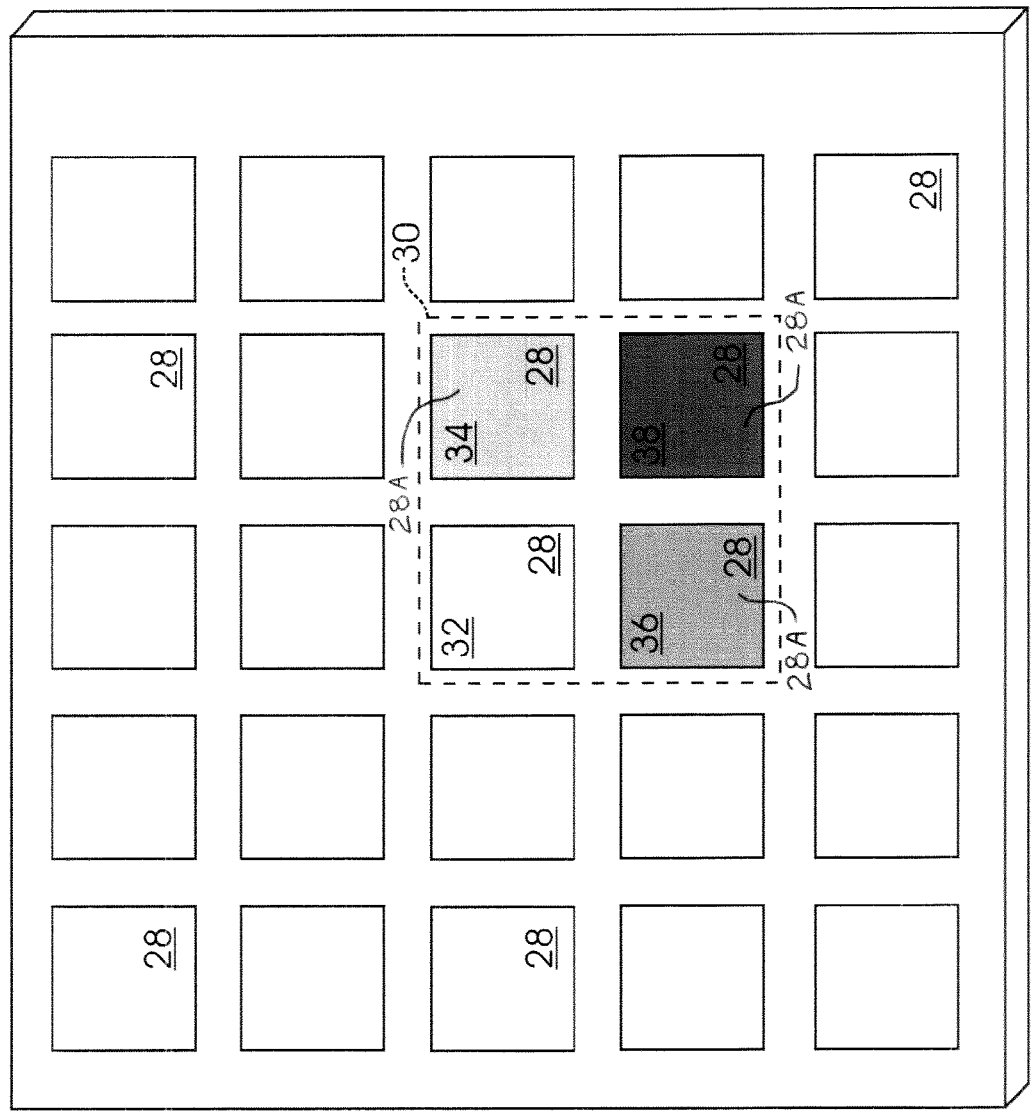
FIG. 2 is a schematic view of a photodiode array and subarray according to one embodiment of the present system and methods for detecting semiconductor-based photodiodes.

FIG. 2 illustrates one embodiment of the present modified photodiode array 26. The array 26 includes a plurality of pixels 28. In FIG. 2 only twenty-five pixels 28 are shown. However, those of ordinary skill in the art will appreciate that in the present embodiments the array 26 can include many more pixels 28, such as, for example, millions of pixels 28. The pixels 28 may comprise any of a variety of materials, such as silicon or indium gallium arsenide (InGaAs).

The array 26 includes a plurality of subarrays, with a first subarray 30 being indicated by the dashed box in FIG. 2. In the illustrated embodiment, the first subarray 30 includes four pixels 28. However, those of ordinary skill in the art will appreciate that the subarrays in the present embodiments may include any number of pixels. The first subarray 30 includes an optical filter layer (28A), which is represented by the shading (28A) over these pixels 28. A first pixel 32 is an open aperture (thus, no shading), while a second pixel 34, a third pixel 36 and a fourth pixel 38 each include increasing concentrations or densities of the filter substance. This optical filter layer thus creates a four element filter structure across the subarray 30. The filter elements are physically aligned to the underlying array pixels 34, 36, 38, producing a four element detector subarray.

In one embodiment the array pixels 28 comprise InGaAs and the optical filter layer comprises differentially doped-Si. With reference to the first subarray 30 illustrated in FIG. 2, the first pixel 32 again comprises an open aperture. That is, it is not coated with any doped-Si. The second, third and fourth pixels 34, 36, 38 are coated with doped-Si at differing doping levels, with the level of doping increasing from the second pixel 34 to the fourth pixel 38. The differing doping levels in the Si layer produce associated differences in bandgap energy edges, with reduction in the bandgap energies (i.e., bandgap shrinkage) achieved by increasing the doping concentration.

The elements of the first subarray are fabricated with four different spectral filtering characteristics. In one embodiment, the three doped-Si film filters are spectrally positioned to extend from wavelengths throughout the absorption edge of commercial Si photodiodes to approximately 50 mm longer wavelengths. These optical properties can advantageously be produced by readily achievable doping concentrations in the range of approximately $1 \times 10^{17}$ cm$^{-3}$ to approximately $5 \times 10^{19}$ cm$^{-1}$. The InGaAs photodetector array's spectral coverage (0.9 micron to 1.7 micron) is well suited for this approach. Comparison of the photodiode signals from the subarray elements indicates whether the illumination striking the subarray 30 is being emitted by a material having absorption/reflection characteristics representative of a semiconductor material with a bandgap energy of approximately 1.1 eV. If the illumination indicates such absorption/reflection characteristics, it is likely that the illumination is being reflected from a Si-based photodetector.

Figure 3:
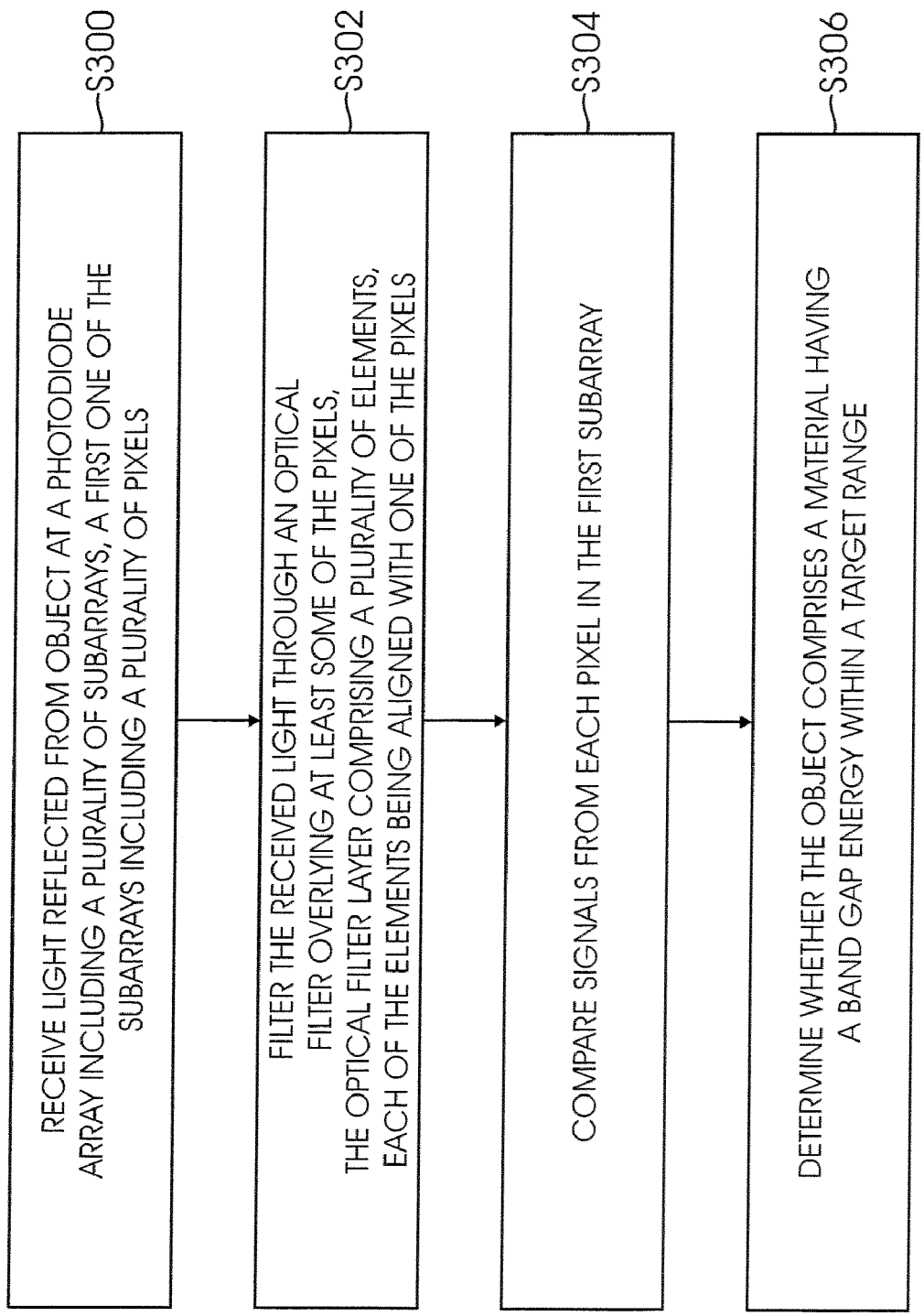
FIG. 3 is a flowchart illustrating steps in one embodiment of the present methods for detecting semiconductor-based photodiodes.

FIG. 3 illustrates the steps in one embodiment of the present methods for detecting an object including a semiconductor-based photodiode. At step S300 the method comprises the step of receiving light reflected from the object at a photodiode array including a plurality of subarrays, a first one of the subarrays including a plurality of pixels. At step S302 the received light is filtered through an optical filter overlying at least some of the pixels, the optical filter layer comprising a plurality of elements, each of the elements being aligned with one of the pixels. At step S304 the signals from each pixel in the first subarray are compared. At step S306 it is determined whether the object comprises a material having a band gap energy within a target range.

In one embodiment, comparison of the subarray element signals employs the following analysis logic. Received light that has been reflected from materials that are not influenced by optical absorption arising from semiconductor (band edge) absorption will show subarray element intensity variations determined by the spectral distribution of the illumination and the optical cutoff characteristics of the filter elements. There will be significant optical variation between subarray element intensities due to the differing band edges of the filter elements. By contrast, received light that has been reflected from a silicon photodetector will be predominantly longer wavelength light (associated with sub-bandgap energy photons) reflected from the metallized backside of the photodetector, together with a much smaller fraction of light for wavelengths in the range of Si bandgap absorption and shorter wavelengths. The latter received light will be produced by the small fraction of light returned due to reflection at the photodiode's surface. While this surface-reflected, bandgap-energy and shorter wavelength light will be differentially acted on by the four filter elements 32, 34, 36, 38, this returned light represents a small fraction of the total light seen by the subarray elements 32, 34, 36, 38. Thus, most of the light received from Si photodiodes will not be affected by the subarray filter elements 32, 34, 36, 38. Consequently, there will be a much smaller variation between the subarray element signal intensities for light returned from Si photodiodes.

Each photodiode subarray 30 comprises an "effective pixel," in that each subarray 30 indicates either the presence or the absence of a silicon photodiode. The sizes of the overall array 26 and each subarray 30 will thus control the primary spatial resolution of a video system (not shown) that is configured to spectrally image a surveillance area and that includes the present system for detecting semiconductor photodiodes. The large photodiode arrays that are now commercially available make the present system a practical approach to detecting photodiodes, which may indicate the presence of OIEDs. Indeed, when dividing today's large photodiode arrays into four element subarrays the resulting number of subarray-based "effective pixels" is fully sufficient to yield an effective OIED detection system. For applications requiring the monitoring of large areas and/or the detection of OIEDs at large distances, multiple video systems may be used. The combination of a simple modification of commercial photodiode arrays and signal comparison between elements (pixels) in the subarrays provides the technical capability to detect the presence and location of Si photodiodes, as a means of detecting possible OIEDs. Simple modification of current large photodiode arrays also advantageously provides a detection system that can scan at high speeds, making the present embodiments useful for battlefield applications where faster scanning speeds can reduce the risk that OIEDs might not be detected before it is too late.

While the embodiments above have been described with respect to a photodiode array comprising InGaAs with a doped-Si optical filter layer, those of ordinary skill in the art will appreciate that other materials and configurations could be used instead. For example, in one alternative embodiment the photodiode array 26 could comprise Si with a silicon-germanium (SiGe) detection layer. The differing spectral response characteristics of the subarray elements 32, 34, 36, 38 can be created by varying an amount of germanium in the SiGe layers overlaying the pixels. In another alternative embodiment the photodiode array 26 could comprise Si with an optical filter layer comprising a nanostructured absorption layer with differing dimensions of nanostructures. For example, the nanostructures overlaying the second pixel 34 may have a smaller average dimension from the nanostructures overlaying the third pixel 36, which may in turn have a smaller average dimension from the nanostructures overlaying the fourth pixel 38. The nanostructures could comprise silicon or germanium or SiGe.

The above description presents the best mode contemplated for carrying out the present system and methods for detecting semiconductor-based photodiodes, and of the manner and process of making and using them, in such full, clear, concise, and exact terms as to enable any person skilled in the art to which they pertain to make this system and use these methods. This system and these methods are, however, susceptible to modifications and alternate constructions from those discussed above that are fully equivalent. Consequently, this system and these methods are not limited to the particular embodiments disclosed. On the contrary, this system and these methods cover all modifications and alternate constructions coming within the spirit and scope of the system and methods as generally expressed by the following claims, which particularly point out and distinctly claim the subject matter of the system and methods.

What is claimed is:

1. An apparatus for detecting an optical reflection from a device employing photodiodes having a bandgap energy of about 1.1 eV, comprising:
    a photodiode array including a plurality of subarrays, each of the plurality of subarrays having a plurality of pixels, wherein at least one of the plurality of pixels is uncoated and each of a remaining number of the plurality of pixels are coated with a different coating density of a material;
    wherein each of the plurality of pixels has a different spectral response in a wavelength range associated with the band gap energy of about 1.1 eV so that a comparison of a plurality of signals from each of the pixels is configured to indicate whether an optical reflection striking each of the plurality of subarrays is being emitted by the device.

2. The apparatus of claim 1, wherein the material comprises silicon.

3. The apparatus of claim 1, wherein a subarray includes four elements.

4. The apparatus of claim 1, wherein each of the plurality of pixels comprise indium gallium arsenide (InGaAs).

5. The apparatus of claim 1, wherein the material comprises doped silicon.

6. The apparatus of claim 1, wherein each of the plurality of pixels comprise silicon.

7. The apparatus of claim 6, wherein the material comprises silicon-germanium.

8. The apparatus of claim 6, wherein the material comprises a nanostructured absorption layer including a plurality of nanostructures.

9. The apparatus of claim 8, wherein the nanostructures comprise silicon, germanium or silicon-germanium (SiGe).

10. A method for detecting an optical reflection from a device employing photodiodes having a bandgap energy of about 1.1 eV, comprising:
    combining a plurality of subarrays, each of the plurality of subarrays having a plurality of pixels, wherein at least one of the plurality of pixels is uncoated and each of a remaining number of the plurality of pixels are coated with a different coating density of a material, and wherein each of the plurality of pixels has a different spectral response in a wavelength range associated with the band gap energy of about 1.1 eV;
    configuring each of the plurality of subarrays to indicate whether an optical reflection striking each of the plurality of subarrays is being emitted by the device;
    comparing a plurality of signals from each of the pixels to determine whether an optical reflection striking is being emitted by the device.

11. The method of claim 10, wherein the material comprises silicon.

12. The method of claim 10, wherein each of the plurality of pixels comprises indium gallium arsenide (InGaAs).

13. The method of claim 10, wherein the material comprises doped silicon.

14. The method of claim 10, wherein each of the plurality of pixels comprises silicon.

15. The method of claim 10, wherein the material comprises silicon-germanium.

16. The method of claim 10 wherein the material comprises a nanostructured absorption layer including a plurality of nanostructures.

17. The method of claim 16, wherein the nano structures comprises silicon, germanium or silicon-germanium (SiGe).

* * * * *